Jan. 8, 1935.  A. R. MABEY  1,987,200
CONTROL MECHANISM
Filed Jan. 2, 1934
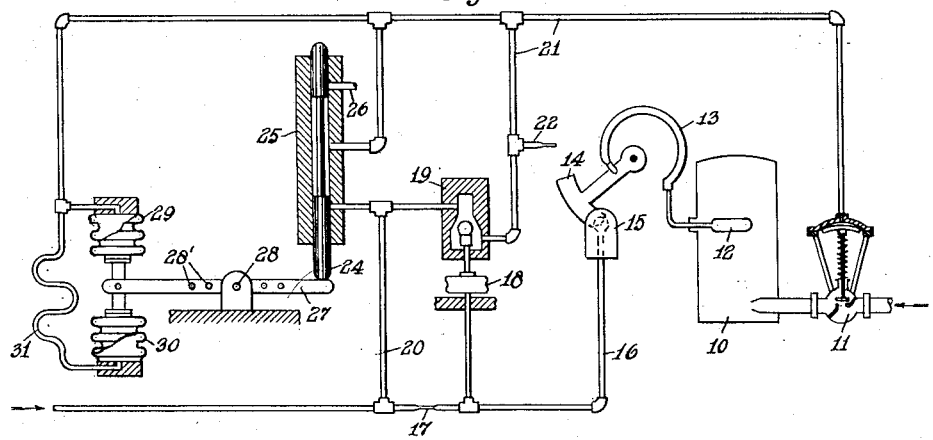
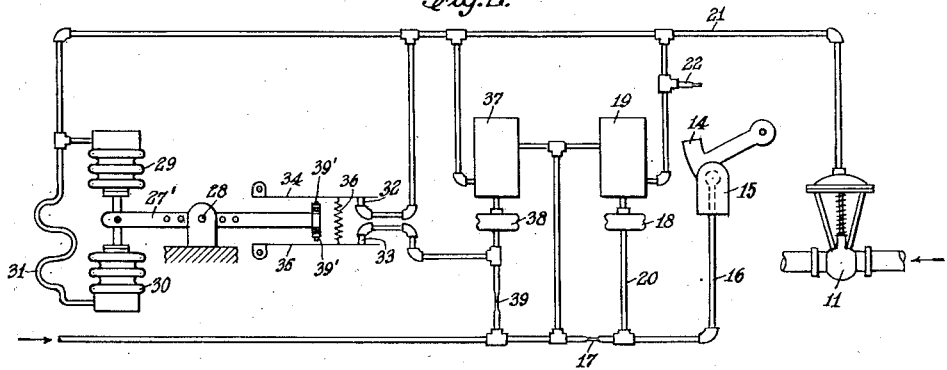
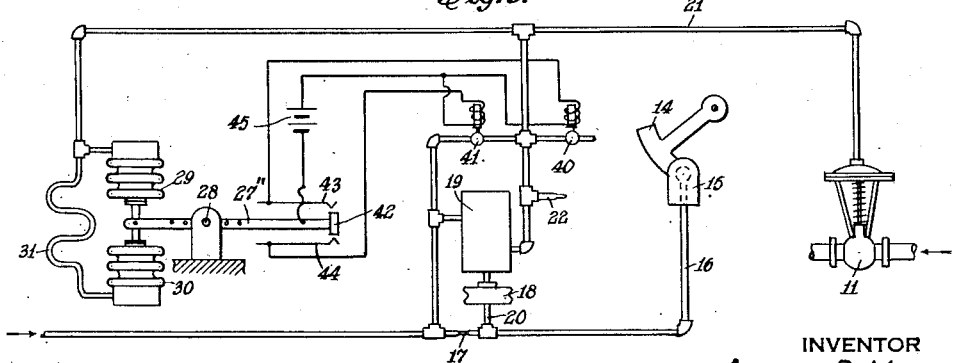
INVENTOR
ARTHUR R. MABEY
BY
ATTORNEY Patented Jan. 8, 1935

1,987,200

UNITED STATES PATENT OFFICE 1,987,200

CONTROL MECHANISM

Arthur R. Mabey, Waterbury, Conn., assignor to The Bristol Company, Waterbury, Conn., a corporation of Connecticut Application January 2, 1934, Serial No. 705,041

6 Claims. (Cl. 236—82)

The invention relates to control mechanisms, and more particularly to control mechanisms or systems of the type in which a variable condition is controlled to a predetermined magnitude through the agency of an expansible fluid, such as air, acting upon a pressure-actuated valve, the fluid in turn being controlled by a movable member responsive to changes in the magnitude of the condition to be controlled. It is a well known fact that in control systems of this type there is a tendency, when the apparatus is adjusted to high sensitivity, for oscillations to be set up in the valve, with a consequent variation of the controlled magnitude about the desired predetermined value, and that, in order to bring these variations within permissible limits it may be necessary to reduce the sensitivity of the control apparatus much below that which should characterize its performance.

It is an object of the present invention to provide means whereby the control may be effectually stabilized without sacrifice of sensitivity. A further object resides in the provision of means whereby such stabilization may be effected with a minimum consumption of control fluid.

Another object is to secure such stabilizing means without the necessity of making attachments or adjustments to the primary controlling elements of the system, or in any way modifying the main control valve.

In carrying out the invention, there is associated with primary control mechanism, including a fluid-pressure-actuated valve and means responsive to changes in the magnitude of the condition to be controlled adapted to effect corresponding changes in said fluid pressure, a secondary control mechanism embodying a three-way valve which in one of its extreme positions provides for an increase in the pressure of the fluid upon the said fluid-pressure-actuated valve and in its opposite extreme position for a reduction in the said pressure thereon, while in its neutral position it is without effect thereon.

A differentially acting fluid pressure means, furthermore, is provided for controlling the said three-way valve and is subject to the fluid pressure applied to the said fluid-pressure-actuated valve, there being included between the elements of the differentially acting means time delay means adapted upon change in applied fluid pressure to throw said differential means temporarily out of equilibrium.

The nature of the invention, however, will best be understood when described in connection with the accompanying drawing, in which:

Fig. 1 illustrates, more or less diagrammatically, a preferred form of the invention, showing the manner in which it may be associated with, for example, a pneumatic temperature control apparatus of the conventional type.

Fig. 2 is a similar view of an alternative form, embodying certain modifications in the compensating mechanism.

Fig. 3 illustrates a further modification, in which the auxiliary elements of the control system are electrically actuated.

Referring to the drawing, 10 designates a closed vessel or enclosed space in which it is desired to maintain, by the admission of a suitable heating agent such as steam and through a diaphragm-motor valve 11, a constant temperature, and as may be determined by a sensitive bulb 12. The latter contains an expansible fluid and forms part of a closed system including a Bourdon tube 13, which latter is adapted to respond to changes in pressure of the enclosed fluid due to changes in temperature to which the bulb 12 may be exposed. Actuated by the Bourdon tube 13 is a thin vane 14 swinging between the jets of a double-opposed nozzle or orifices 15 and adapted thereby more or less to obstruct the venting of the same to the atmosphere.

The nozzle 15 is attached to a pipe 16 which receives a supply of air from a substantially constant pressure source, as through a conduit having a constricted portion 17 affording a throttling effect, so that the pressure in the pipe 16 will vary with the position of the vane 14. A metallic bellows 18 is connected to the pipe 16, and is designed to actuate a pilot valve 19 in such a manner that the valve 19 will be closed upon an increase of pressure in the pipe 16. Air from the pressure source is fed directly to the valve 19 through a pipe 20 connected ahead of the constricted portion 17, and from the valve 19 through a pipe 21, having a constricted vent or bleeder 22, to the diaphragm-motor of the valve 11.

The apparatus, as thus far described, is substantially identical with that set forth in U. S. Letters Patent No. 1,880,247; and no claim is made thereto, the present invention residing in the provision of secondary control mechanism for modifying the performance of the primary control mechanism. The operation of the latter may briefly be described as follows: Assuming the system first in a state of equilibrium, the supply of heat being equal to the demand, the valve 11 will be floating at a position to admit sufficient of the heating medium to maintain the balanced state. Then, assuming that conditions arise demanding an increased supply of heat in the space 10, this will first be manifested in a drop of temperature at the bulb 12, whereupon the Bourdon tube 13 will deflect in a sense to close the orifices of the nozzle 15, thereby decreasing the escape of air and causing the pressure in the pipe 16 to assume a higher value than before. The bellows 18 will thereupon be caused to expand in a sense to close the pilot valve 19, causing the pressure in pipe 21 to drop, so that the diaphragm motor of the valve 11 will increase the valve opening, admitting more of the heating medium and thus tending to restore the controlled temperature to the predetermined value.

It will be apparent that upon a rising temperature, due to a decreased demand for heat, the action of all elements described will be the reverse of that outlined, and that the control system will at all times endeavor to maintain a predetermined temperature of the medium in the space 10.

While a control system as hereinbefore described will tend to maintain the controlled condition at a mean value in agreement with the predetermined magnitude, it has been found that, particularly upon sudden demands for correction, there is a tendency for the system to "over-control", or to set up oscillations, which may or may not be subject to ultimate attenuation, but which in any case are objectionable and detract from the otherwise desirable characteristics of the control. Attempts to rectify this condition by placing a constriction in the pipe 21, tend to reduce the sensitivity of the control; and enlarging the vent 22, while tending toward a corrective effect, will materially increase the wastage of air.

In accordance with the present invention, there is provided an accessory device or secondary control mechanism which is adapted to be attached to the piping of the system without requiring any modification in the aforesaid primary control mechanism or associated valves. This secondary control mechanism is adapted to be actuated by changes in the control pressure set up by the primary control elements, and in such a manner as to neutralize temporarily those changes and superimpose on each pressure impulse a transient impulse in an opposite sense and of such period as to damp out such oscillations as might otherwise develop in the system. This is to be effected without limiting in any way the response of the control valve to the instantaneous magnitudes of the control pressure.

Thus, as indicated in Fig. 1, a three-way valve is provided and comprising a plunger 24 coacting with a ported body 25, the arrangement being such that when the plunger is moved toward its one extreme position the control pipe 21 is placed in communication with the fluid supply, by-passing the valve 19, and when the plunger is moved toward its other extreme position the pipe 21 is vented to the atmosphere through an orifice 26.

The position of the plunger 24 is arranged to be controlled, for example, by means of a lever 27, mounted upon a fulcrum 28 and adjustable relatively thereto in the provision of a plurality of pivot holes 28' through the said lever. The latter is, furthermore, subject to the joint influence of opposed or differentially acting bellows members 29 and 30. When these bellows members have the same fluid pressure applied internally thereto, the plunger 24 assumes an intermediate neutral position wherein no air may pass through the ports or orifices of the valve.

Furthermore, the bellows member 29, which when expanding under pressure tends to open the orifice 26, is connected to the pipe 21, so that it responds to changes in pressure within that pipe practically instantaneously. However, the bellows member 30, which opposes the action of the bellows member 29, is also supplied with fluid under pressure from the pipe 21, but through a constricted section 31, so that, while its responses are similar to those of bellows member 29, they are not synchronous therewith, but lag behind the same by a more or less definite time interval.

The operation of the stabilizing device hereinbefore set forth is as follows: Assuming that there occurs a change in the controlled condition which requires an increased pressure upon the diaphragm of valve 11, the pilot valve 19 will be opened by action of bellows 18, admitting to the pipe 21 an increased supply of air, tending to raise the pressure in that part of the system. The valve 11 will immediately start to respond to this increased pressure; but at the same time the bellows 29 will be deflected in a sense to cause the lever 27 through plunger 24 to vent air from the pipe 21 through the orifice 26 to the atmosphere, thus for a time partially offsetting the tendency of pressure to increase in the pipe 21. Meanwhile the restricted flow of air through section 31 has a tendency gradually to equalize the pressures in the bellows members 29 and 30, and thereby gradually to reduce the offsetting tendency which was at first set up by the action of bellows member 29. When the pressure becomes fully equalized in both bellows members, the pressure in pipe 21 will be determined solely by the action of the primary controller.

Thus it will be seen that upon a relatively rapid and predetermined change of the pressure in pipe 21, this change will be transiently opposed by the action of the three-way valve to effectively damp out any tendency of the control system to set up a state of oscillation. It will further be seen that this damping effect is brought about without interposing any restriction to free flow of air between the pilot valve 19 and the control valve 11, and that, moreover, the magnitude of the effect of the correction will be proportioned to the suddenness of the change of pressure in the control pipe 21. It will also be realized that the momentary opening of the vent 26 at the times of sudden pressure rise in the pipe 21 will be responsible for a much smaller volume of air being bled to the atmosphere than were an equivalent opening to be maintained at the orifice 22.

The extent of response of the three-way valve to movements of the bellows members may be varied by adjusting the fulcrum 28 toward one or other end of the lever 27 through shifting of the pivot opening 28', whereby the sensitivity of the corrective device may be adjusted to different requirements of conditions of control. Further adjustment may be effected to meet unusual conditions by varying the dimensions of the constricted portion 31, or by throttling or otherwise restricting the flow of air from the pipe 21 to the combined assembly of bellows members 29 and 30.

In Fig. 2 is shown an alternative form of apparatus embodying the invention and wherein the three-way valve is replaced by a spring-centered "flapper-valve" assembly. Two opposed and divergent jet nozzles 32 and 33 are maintained in a normally closed condition by light pivoted plates 34 and 35, respectively, held into engagement with the nozzles by a common spring member 36, in a manner similar to the keys or stops of a flute. Between the plates 34 and 35 is disposed the lever 27', so that in its mid-position, when the bellows members 29 and 30 are exposed to equal internal pressures, it engages neither of the plates, and both jets remain closed. A pilot valve 37, similar in all respects to the pilot valve 19 of the primary control mechanism, is adapted to be actuated by a bellows member 38, receiving air from the supply through a constricted section 39.

The nozzle 33 is connected to bleed air from the bellows member 38, thus lowering the pressure therein, and causing the valve 37 to admit air from the supply to the pipe 21. The nozzle 32, on the contrary, is connected to vent air from the pipe 21. Thus it will be seen that a deflection of the lever 27' in a sense to open the nozzle 32 will tend to lower the pressure in the control line, while opening of the nozzle 33 will tend to raise the pressure in the control line, so that the ultimate effect of the elements of the embodiment set forth in Fig. 2 is substantially identical with that shown in Fig. 1. Adjustable ends, as the screw caps 39' provided at the engaging end of lever 27', admit of variations in the time of opening of the respective nozzles 32 and 33.

In Fig. 3 is shown an electrical control for the system. To the pipe 21 are connected two solenoid-actuated valves 40 and 41, the former being arranged to bleed air from the pipe 21 and the latter to admit air thereto from the supply main. The lever 27" to this end terminates in a contact member 42 arranged to coact with either of two contacts 43 and 44, connected respectively to the actuating coils of the solenoid valves 40 and 41, and having a common source of electrical energy, as a battery 45, so that one or other of the valves will be opened according to the sense in which the lever 27" is deflected from its intermediate neutral postion. Upon a rise of pressure in the pipe 21, the bellows member 29, working in immediate response thereto, will cause the circuit to be completed at contact 43 and the valve 40 opened, so that air is vented from the pipe 21 and the tendency of the pressure to increase temporarily opposed until the bellows members are again in a state of equilibrium. In a similar manner, a decrease of pressure in the pipe 21 will cause the valve 41 to be opened, air admitted from the supply, and the fall of pressure temporarily opposed. Thus there is again produced an effect substantially identical with that set forth as characterizing the embodiment shown in Fig. 1.

I claim:

1. In a fluid-pressure-actuated control system including a source of expansible fluid supply: the combination with a primary control mechanism tending to establish and maintain a condition at a predetermined magnitude; of a secondary control mechanism including valve means mechanically independent of said primary control mechanism and adapted to modify the performance of the same, and a pair of opposed fluid-pressure-responsive members connected with the actuating fluid as supplied to the primary control mechanism and having therebetween time delay means, said responsive members being adapted when in equilibrium to maintain said valve means in a neutral condition and when differentially actuated to cause said valve means to modify the performance of said primary control mechanism.

2. In a fluid-pressure-actuated control system including a source of expansible fluid supply: the combination with a primary control mechanism tending to establish and maintain a condition at a predetermined magnitude, and including a pressure-actuated valve; movable valve means for regulating the flow of fluid thereto and adapted in one position to effect a closing action of said pressure-actuated valve, and in another position to similarly effect an opening action of said valve, and having an intermediate neutral position in which the said flow of the expansible fluid from the source of fluid supply is completely shut off, and differential fluid-pressure-actuated means adapted upon change of fluid pressure applied to said valve to move said movable valve means to control flow of fluid to or from said valve in a sense to oppose temporarily said change in pressure, and subsequently to move said movable valve means to its intermediate position.

3. The combination of claim 1, wherein adjusting means is provided to vary the effect of said secondary control mechanism relatively to said primary control mechanism.

4. In a fluid-pressure-actuated control system for establishing and maintaining a condition at a predetermined magnitude and including a source of expansible fluid supply: the combination with a primary control mechanism including a fluid-pressure-actuated valve, and means responsive to changes in the magnitude of the condition to be controlled adapted to effect corresponding changes in said fluid pressure; of a three-way valve member connected with the source of fluid supply, to the primary control mechanism and to the atmosphere and having a neutral position in which the flow of the expansible fluid from the source of fluid supply through the said three-way valve is completely shut off, one extreme position in which the expansible fluid may be admitted to increase the fluid pressure upon said primary mechanism, and another extreme position in which the expansible fluid may be bled therefrom to decrease its pressure, a pair of opposed bellows members adapted when in equilibrium to maintain said three-way valve member in its neutral position, and time delay means therebetween adapted upon change in the fluid pressure of the primary control mechanism to throw said bellows members temporarily out of equilibrium.

5. In a pneumatic control system, including a source of air under pressure, a fluid-pressure-actuated valve, and means, subject to a condition to be controlled by said valve and adapted to regulate the pressure of the air admitted thereto in a sense to establish and maintain said controlled condition at a predetermined magnitude: a further valve means adapted to increase the air pressure on said pressure-actuated valve independently of said regulating means, or to decrease the same by venting more or less of said air to the atmosphere, or to assume a neutral position, and a differential fluid-pressure-actuated means adapted, upon a change in air pressure applied to said fluid-pressure-actuated valve, to control said further valve means in a sense first to assume a position to oppose said change in pressure, and subsequently to assume its neutral condition.

6. In a fluid-pressure-operated control system of the type comprising a source of elastic fluid, a fluid-pressure-actuated fluid-supply valve subject to a control couple having a stationary nozzle member ported to the atmosphere and a movable vane member sensitive to changes in the magnitude of a condition to be controlled, and by its motion to vary the effective opening of said ported member: movable valve means connected with the said fluid-supply valve for regulating the flow of fluid thereto and adapted in one position to effect a closing action of said pressure-actuated supply valve, and in another position to similarly effect an opening action of said valve, and having an intermediate neutral position in which the flow of elastic fluid is completely shut off, and differential fluid-pressure-actuated means adapted, upon change of fluid pressure applied to said pressure-actuated supply valve, to move said movable valve means to control flow of fluid to or from said valve in a sense to oppose temporarily said change in pressure, and subsequently to move said movable valve means to its intermediate position.

ARTHUR R. MABEY.